United States Patent [19]

Faulkner et al.

[11] 4,171,067
[45] Oct. 16, 1979

[54] WEIGHING AND DISPENSING DEVICE

[75] Inventors: Keith Faulkner, Bexley; David E. Appleford, Romford, both of England

[73] Assignee: Portionmat (Engineering) Limited, England

[21] Appl. No.: 853,828

[22] Filed: Nov. 21, 1977

[30] Foreign Application Priority Data

Nov. 22, 1976 [GB] United Kingdom ............. 48663/76

[51] Int. Cl.² .......................................... G01G 13/00
[52] U.S. Cl. ...................................... 222/1; 177/106; 200/333; 222/36; 222/77; 222/108; 222/146 HE; 222/56
[58] Field of Search ............. 177/64, 106, 111; 200/61.62, 61.85, 61.86, 333; 221/150 A; 222/1, 23, 24, 30, 36-38, 55, 56, 77, 146 H, 146 HE, 108, 196, 199, 200

[56] References Cited

U.S. PATENT DOCUMENTS

| | | | |
|---|---|---|---|
| 1,618,436 | 2/1927 | Kapuczin | 222/37 |
| 2,151,107 | 3/1939 | Howard | 177/103 |
| 2,785,623 | 3/1957 | Graham | 221/150 A |
| 2,792,030 | 5/1957 | Wahl | 222/200 |
| 3,849,615 | 11/1974 | Fisher | 200/333 |

Primary Examiner—Robert J. Spar
Assistant Examiner—H. Grant Skaggs
Attorney, Agent, or Firm—Roylance, Abrams, Berdo & Farley

[57] ABSTRACT

A unit for weighing and dispensing portions of hot, fried, potato chips, comprises a casing in which are disposed a receptacle for receiving a supply of the chips, and a dispensing chamber opening into said receptacle and into which hot chips are fed by a vibrator unit coupled to a bottom wall of the receptacle, a heating element for maintaining chips hot while in the receptacle and in the dispensing chamber, the bottom wall of the receptacle being inclined upwardly in the direction of the dispensing chamber for allowing hot frying oil or fat to drain away in the opposite direction and into a collector, a weighing platform disposed inside the dispensing chamber and being hinged to a movable weighing support disposed outside the dispensing chamber and guided for vertical linear movement, the weighing platform being retained in a position to receive the hot chips and being released to permit it to hinge downwardly and discharge the hot chips therefrom in response to a predetermined amount of linear movement of the weighing support, and hot chips being levelled to control the feed of chips to the weighing platform.

10 Claims, 9 Drawing Figures

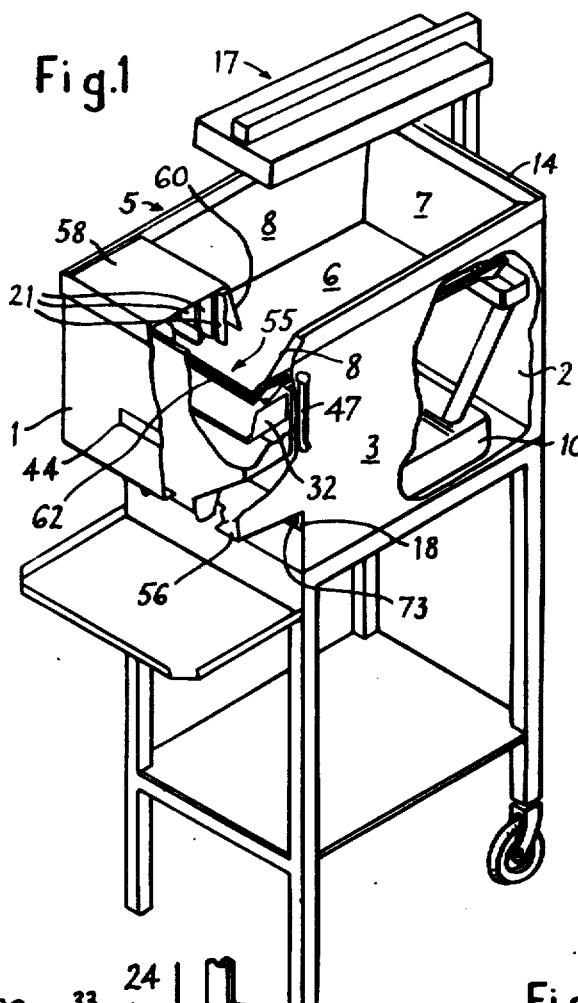
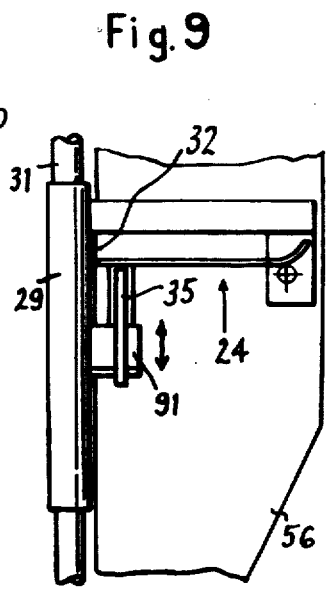
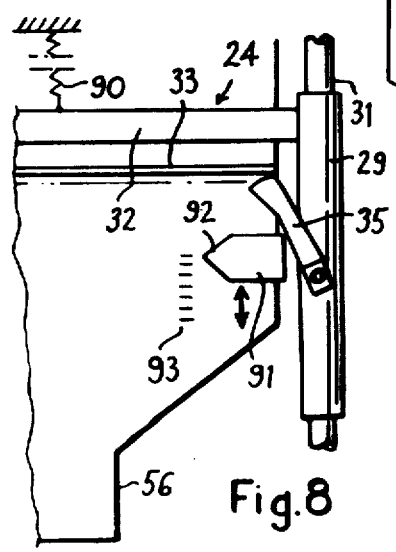
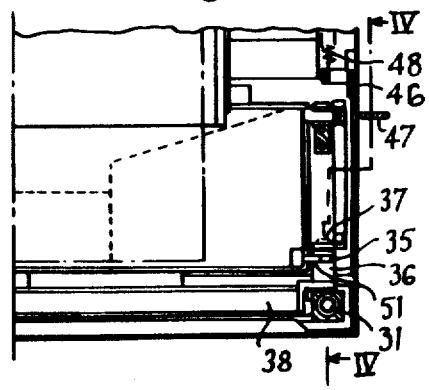

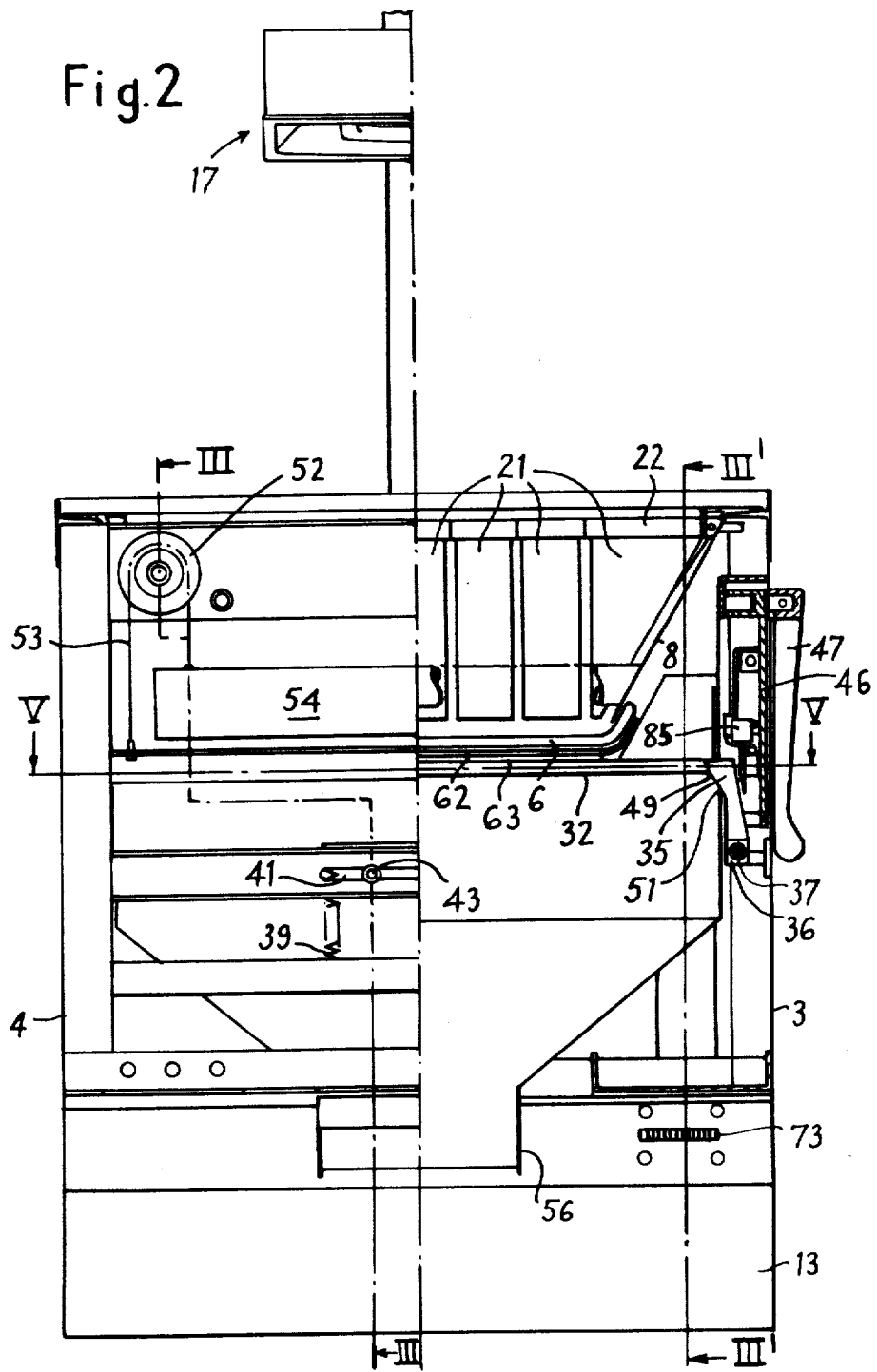

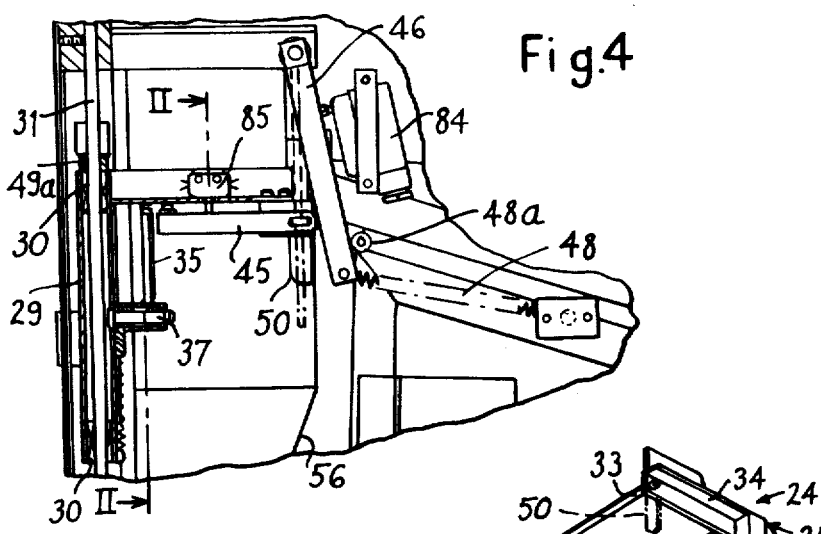
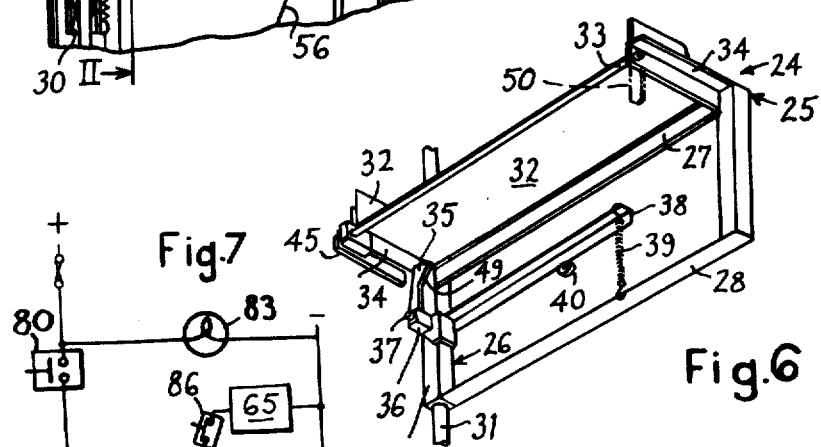
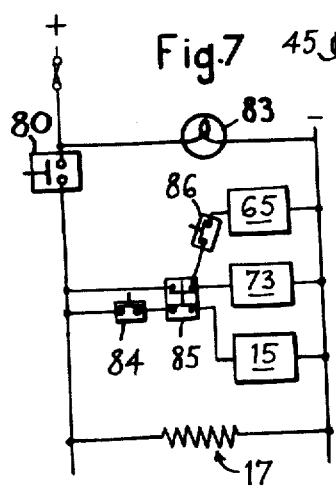
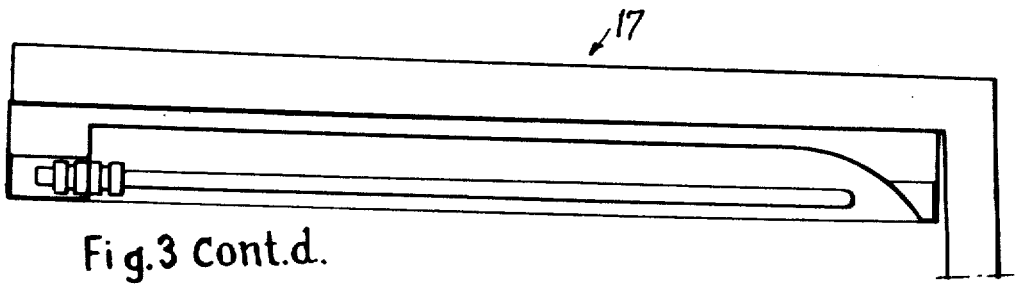

WEIGHING AND DISPENSING DEVICE

BACKGROUND OF THE INVENTION

Field of the Invention

The present invention relates to weighing and dispensing portions of food or other material and, more particularly, although not exclusively, to the dispensing of predetermined portions of cooked potato chips, fried potatoes, croquettes or other cooked food stuffs.

Scoop-out portioning, as employed everywhere from fish and chip takeways and fast food restaurants to large commercial and canteen kitchens, is subject to considerable weight discrepancies usually to the disadvantage of the caterer since kitchen staff are more likely to over-portion than give customers too little and risk complaint. For example, the Applicants estimate that an average shop/restaurant with a weekly intake of 455 kilograms of blanched frozen chips/french fries could lose from £40 to £50 per week by using conventional scoop-out portioning. Losses on a far greater scale could be incurred by caterers, motorway cafes and large industrial canteens. Furthermore, the exact number of portions served is rarely known.

It is an object of this invention to weigh and dispense portions of food or other material, particularly cooked potato products, by providing a unit in which the above mentioned difficulties are minimized or eliminated and, in which in particular, the portions can be accurately weighed and dispensed automatically, permitting accurate portion control.

It is another object of the invention to count each weighed portion.

SUMMARY OF THE INVENTION

The invention consists in a device for weighing and dispensing portions of hot, fried, potato chips of predetermined weight from a supply of such material, comprising a weighing means including a hinged weighing platform or pan vibrator means arranged to feed material onto the weighing platform, and retaining means for retaining the platform in a position to receive the material and adapted to release the platform so as to permit it to hinge downwardly and discharge the material on the platform in response to the weighing means detecting a predetermined weight of material on the platform, the operation of the vibrator means preferably being interrupted in response to release of the platform.

By means of the invention, accurately weighed portions of hot, fried, potato chips can be dispensed automatically thereby resulting in a substantial saving to caterers.

After each dispensing operation, the weighing platform may be manually reset to its material-receiving position and the action of resetting the platform may also serve to recommence delivery of the material to the weighing platform or pan by the feeding means. Preferably the platform is reset by mechanism including externally adjustable means such as a resetting handle and cooperating switching means which are arranged to ensure that the handle cannot be actuated to hold the weighing platform in its weighing position to increase the weight of the portions dispensed.

Conveniently, the retaining means comprises a latch member which engages the platform or pan in order to retain it in a substantially horizontal, material-receiving position and which is actuated in response to the weighing mechanism detecting the predetermined weight to disengage it from the platform and allow the latter to hinge downwardly. In a preferred embodiment the weighing mechanism comprises a vertically movable weighing frame, on which the weighing platform is hinged, and a spring-biassed weighing arm pivoted to the weighing frame and resting on a stop which is fixed with respect to the weighing frame so that depression of the weighing frame swings the weighing arm about its pivot. The weighing arm is connected to the latch member, which is also mounted on the weighing frame, and the movement of the weighing arm in response to the depression of the weighing frame produced by the predetermined weight of material being delivered to the weighing platform, causes the latch member to release the platform and dispense the portion of material on the platform. Preferably, the latch member is secured to the weighing arm at the pivot point so that it is rocked directly by the weighing arm in response to movement of the weighing frame. The stop against which the weighing arm bears may be adjustable so as to enable preselection of the weight of the portion to be dispensed.

The weighing platform may be disposed within a dispensing chamber which, itself, is disposed inside and may be partly surrounded by the weighing frame. The weighing platform is hinged to the weighing frame by a hinge pin or shaft extending between opposite sides of the weighing frame and projecting through vertical slots in the dispensing chamber walls. At its lower end, the chamber may terminate in a dispensing funnel through which the material can be discharged into a bag or other receptacle.

To avoid any possibility of additional material being dispensed by the vibrator means after release of the weighing platform preferably means responsive to the movement of the platform are provided to shut-off dispensing of any material after release of the platform.

The device according to the invention is particularly designed for dispensing hot, fried, potato chips, and to this end preferably includes electrical heating means for keeping the food stuffs warm whilst they are retained on the feeding means for delivery to the weighing platform.

The invention also consists in a method of weighing and dispensing a portion of hot, fried, potato chips of predetermined weight from a supply of such food.

BRIEF DESCRIPTION OF THE DRAWINGS

FIG. 1 is an isometric view of a unit constructed in accordance with the invention for weighing and dispensing a predetermined portion of hot, fried, potato chips, with parts broken away, FIG. 2 is a front elevation of the unit, with the front panel removed and partially in section, the section being taken along the line II—II of FIG. 4, FIG. 6 is an isometric view showing details of the weighing mechanism, FIG. 7 is a circuit diagram, and FIGS. 8 and 9 are diagrammatic scrap views of a modification.

DESCRIPTION OF PREFERRED EMBODIMENTS

Figure 3:
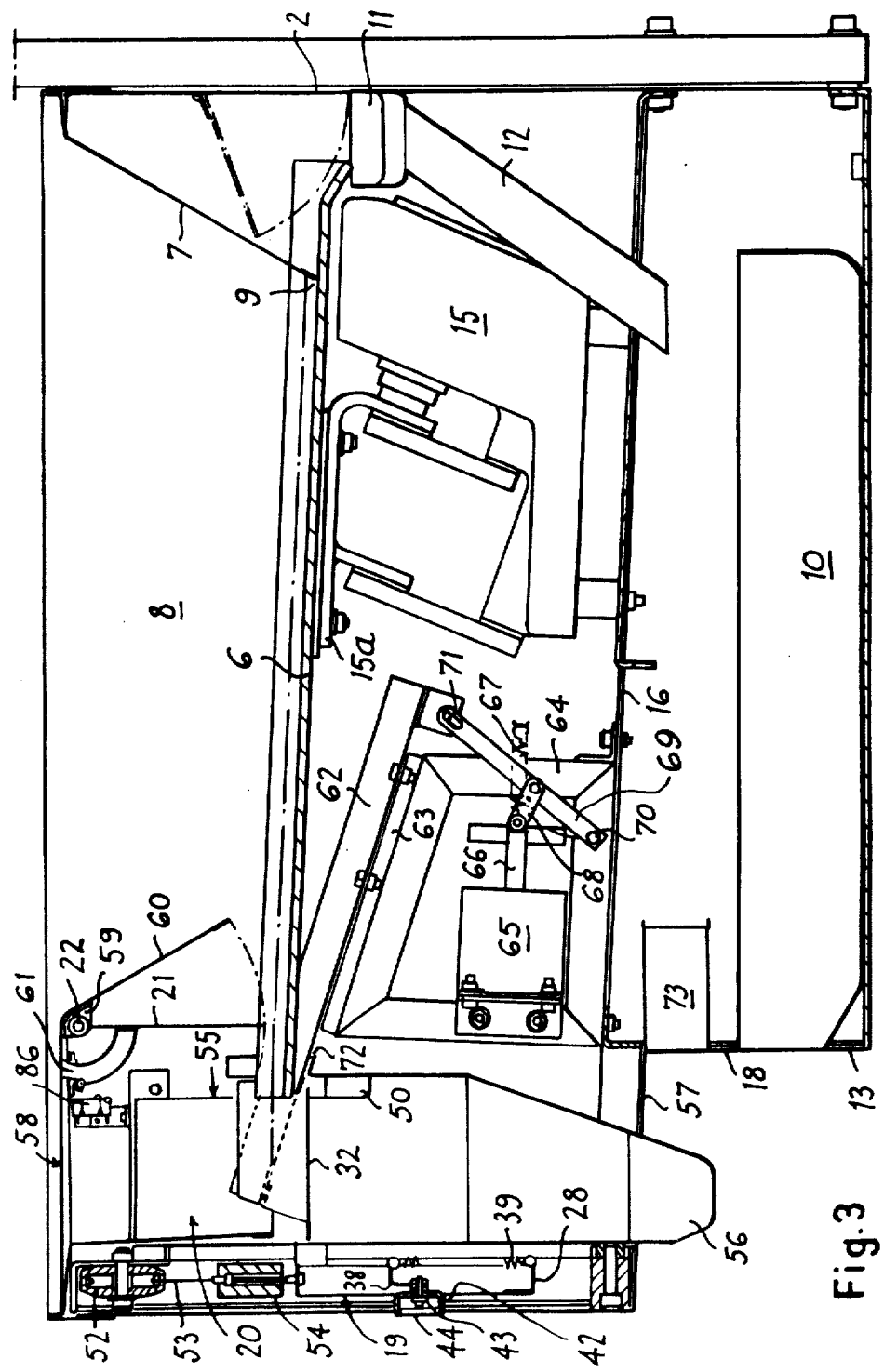
FIG. 3 is a longitudinal section through the device, taken partly along the line III—III and partly along the line III'—III' of FIG. 2, FIGS. 4 and 5 are scrap sections taken along the lines IV—IV of FIG. 5, and V—V of FIG. 2 respectively.

Referring to the drawings, the unit comprises a casing which is of rectangular shape in plan and comprises front and back panels, 1, 2 and side panels 3, 4. As shown in FIG. 1 the casing is supported on a stand which is provided with a serving tray. Disposed in the open top of the casing is a chip container receptacle or scuttle 5 having a back wall 7 and two side walls 8 and comprises a separate bottom wall constituting a vibration tray 6 which slopes upwardly towards the front of the casing. The back and side walls 7, 8 are inclined with respect to the vibration tray 6 with the side walls 8 overlapping the tray sides (see FIG. 2) and with there being a gap 9 between the bottom end of the back wall 7 and the tray 6, along the back wall to permit surplus oil or fat on the chips placed in the container 5 to drain into a trough 11 below the downwardly inclined rear end of the tray 6 and through a spout 12 and into collecting means constituted by an oil drawer 10 slidably mounted in the bottom of the casing. The top edges of the back and side walls of the container 5 are continuous with the back and sides of a rectangular rim which is hooked over the top edges of casing panels and has an oil spill prevention lip 14 (FIG. 1). The drawer 10 is removable through an opening 13 in a front panel member 18 and for this purpose may be provided with a handle (not shown) on its front end.

Mounted in the space between the vibration tray 6 and the oil drawer is a commercial vibrator unit 15. This unit is supported on a transverse plate 16 secured between the side panels 3, 4 of the casing and its coupling member 15a is in engagement with the underneath of, and supports, the vibrator tray 6. The back panel 2 of the casing supports heating means formed by an electrical heating unit 17 having, conveniently an infra-red heating element, for keeping hot fried chips deposited in the container 5. Alternatively or in addition electrical heating elements (not shown) may be provided underneath the tray 6 for heating the tray.

Housed in the front of the casing, forwardly of the container 5 and partition 18 are weighing means constituted by the weighing mechanism 19 and dispensing chamber 20 in which the chips are also kept hot by the heating unit 17. Extending across the front end of the chip container 5 are movable levelling means in the form of levelling flaps 21 depending from a spindle 22 supported between the side walls 8 of the chip container for ensuring that the chips are fed into the chamber 20 and to the weighing mechanism in a regular and controlled manner. The weighing mechanism 19 (see particularly FIG. 6) comprises a movable weighing platform support formed by a weighing frame 24 consisting of two L-shaped side frame members 25, 26 interconnected by two straight front frame members 27, 28. The leg 29 of the frame member 26 is hollow and has bearings 30 therein, there being a fixed vertical guide column 31 extending through the leg 29 and forming guiding means enabling the weighing frame 24 to be vertically and linearly movable therealong. Hinged to the weighing frame 24 adjacent its upper end is a weighing platform 32. This platform is secured along its rear edge to hinge means including a hinge shaft 33 which is journalled at its opposite ends in the arms 34 of the side frame members 25, 26. The weighing platform is retained in a substantially horizontal position for receiving chips from the tray 6 by means of retaining means constituted by a latch member 35 which engages underneath the front edge of the platform and is secured to one end of a sleeve 36 journalled on a pivot pin 37 fixed to the leg 29 of the side frame member 26 (FIG. 4). Secured to the opposite end of this sleeve 36 is a weighing arm 38 which is biassed downwardly by a tension spring 39 fastened between the arm and the bottom edge of the front frame member 28. Intermediate its ends, the arm 38 bears against an adjustable stop 40. The latter is slidably mounted in a horizontal slot 41 in a channel member 42 located behind the front panel 1 of the casing and is manually slidable, by a knob 43 along the arm so as to enable the weight of the portion of chips dispensed to be preselected. The knob 43 aligns with an aperture in the front panel 1 which is covered by a cover plate 44 to aid prevention of unauthorized altering of the preselected weight. A weight scale (not shown) on the channel member 42 and a cooperating pointer (not shown) fixed to the knob provide an indication of the selected weight. Fixed to the arm 34 of the side frame member 26 is a lever 45 which forms part of means in the form of a mechanism for resetting the weighing platform. This resetting mechanism further comprises means, connected to an operating member constituted by a small external crank handle 47 but not to the weighing frame 24 and platform 32, in the form of a lever 46 co-operating with the lever 45 and which is fixed to a pin passing through an aperture in the side panel 3, this pin, in turn, being fixed to the crank handle 47. The lever 46 and thus the handle 47 are urged into their positions illustrated in FIGS. 2 and 4 for a weighing and dispensing operation by a tension spring 48 fixed at one of its ends to the lower end of the lever 46 which abuts against a fixed limit stop 48a. The handle 47 enables the platform to be reset in its substantially horizontal position for weighing chips, after each weighing and dispensing operation, as will hereinafter be described. The inside edge of the latch member 35 adjacent the platform is tapered at 49 (FIGS. 2 and 6) so as to enable the platform to rock the latch member aside as it is returned to its horizontal position and cause the latch member to snap back underneath the platform. A stop 49a limits upward travel of the weighing frame.

The weighing frame 19 is disposed on the outside of the dispensing chamber 20 whereas the weighing platform, itself, is disposed within the chamber 20 and a vertical guide slot 50 is formed in the chamber side wall opposite the post 31 so as to accommodate the adjacent end of the hinge shaft 33, the slot 50 and post 31 providing precise, free vertical movement of the weighing frame relative to the chamber. Similarly, the latch member 35 mounted on the weighing frame projects through a vertical slot 51 (FIGS 2 and 5) in the adjacent chamber side wall for engaging the platform. The weighing frame is supported in a counter-balanced manner on the fixed stop 40 by a counterbalancing arrangement comprising two pulley systems of which one only is shown (see FIGS. 2 and 3). Each pulley system comprises a pulley 52 and a cable 53 extending therearound with one of its ends fixed to the weighing frame 24 and the other of its ends fixed to a common counterweight 54.

The dispensing chamber opens, at its inlet 55, directly into the open end of the chip container 5 so that chips from the container can be fed onto the weighing platform and, at its lower end includes a dispensing funnel 56 terminating in a chamber outlet positioned beneath the inlet and just above the path of movement of the oil drawer 10. The dispensing funnel projects through a bottom partition 57 which closes the lower end of the space containing the weighing mechanism. Thus, the chamber walls form means defining an enclosed path for the hot chips between the chamber inlet and outlet. The upper end of this space is closed by a cover assembly comprising a cover member 58 supported along its front edge on the front portion of the container rim and intermediate its ends on a support member 59 mounted on the levelling flap spindle 22. The cover member has a flap 60 which serves to pre-level out the heap of chips in the container before the chips reach the levelling flaps 21 and are fed onto the weighing platform. The cover member 58 may be provided with a handle (not shown) to facilitate its removal in order to permit access to the dispensing chamber and weighing mechanism and ready removal of chips from the container 5 when the weighing mechanism is inoperative for some reason. Fixed to its undersurface the cover member has a cam member 61 (FIG. 3) for a purpose to be described.

In order to prevent any possibility of further chips from being fed into the dispensing chamber and falling into the chut 56 after release of the platform 32, a shutter means is provided for shutting-off the space above the platform. This shutter means is supported on the transverse plate 16 forwardly of the vibrator 15 and comprises a shutter 62 in the form of a trough shaped blade member having fixed thereto, in the space between the plate 16 and the tray 6, a slide 63 which engages the upper sloping surface of a housing 64 for a solenoid 65. The solenoid armature 66 is held in the illustrated position by a tension spring 67. The solenoid moves the shutter between a non-gating position shown in full lines and a gating position shown in chain lines through a linkage comprising a link 68 pivoted at one end to the free end of the armature and at its other end to a lever 69 intermediate its ends. The lever 69 is pivoted at its lower end to a fixed pivot 70 on the solenoid housing and is connected at its other end through a pin and slot connection 71 to the shutter. When energized, the solenoid pulls the armature inwards against the spring 67 to bring the shutter into its gating position through a gap 72 between the tray 6 and the inner wall of the chamber 20 and when the solenoid is de-energized the shutter simply slides back to its non-gating position with the assistance of the spring 67.

Advantageously, as shown in FIGS. 1 and 2, a seven digit counter 73 is provided above the oil drawer 13 and can be read through an aperture in the partition 18, to keep a constant record of the number of portions dispensed.

To operate the device the cover member 58 is in the illustrated position and the device is electrically connected by a suitable 3-pin plug to a socket of the domestic mains supply and manual switch 80 (see FIG. 7) is actuated to supply the operating circuitry for heater 17, solenoid 65, counter 73 and vibrator 15 with electricity through switches to be described. The circuit also includes a mains light 83. In the unloaded condition, the weighing frame 24 is urged by the action of the spring 39, weighing arm 38 and stop 40 into a position in which the weighing platform 32 is level with the front edge of the tray 6 and in which a microswitch 84 and a double pole microswitch 85 pass electric current to the vibrator unit 15. As will be more fully apparent hereinafter, the microswitch 84 forms a switching means which cooperates with lever 46 to prevent operation of the vibrator unit 15 during operation of the handle 47 and the microswitch 85 forms a second switching means which is responsive to the release of the weighing platform to interrupt the operation of the vibrator unit 15. The movable stop 43 may be adjusted so as to select the required weight for the portions of chips to be dispensed by the device. Movement of the stop to the left, as viewed in FIG. 2, reduces the weight of the portions whilst movement of the stop to the right increases this weight When cooked potato chips are deposited in the container 5 and the vibrator unit 15 is switched-on by actuating the switch 80, chips are fed from the tray 6, underneath the cover flap 60 levelling flaps 21 and onto the weighing platform 32. The platform and weighing frame are gradually depressed, following a linear path, against the action of the spring 39, as the weight of the chips on the platform increases, and, at the same time, the weighing arm is moved in an anti-clockwise direction about the pivot 37 by the stop 40, thereby tending to disengage the latch member 35 from the weighing platform. When the preselected weight of chips has been delivered onto the platform, the weighing frame overcomes the counterbalancing effect of the weight 54 and is depressed to the extent required to release the latch member, whereupon the platform swings downwardly about its hinge shaft 33 to discharge the portion of chips thereon into the dispensing funnel 56. The depression of the counterbalanced weighing frame and subsequent release of the weighing platform is aided by the vibration engendered in the weighing mechanism by the vibrator unit 15. Simultaneously, the downwardly hinging platform is arranged to actuate the microswitch 85 which is switched to another position in which the vibrator unit 15 is switched off in order to interrupt the delivery of chips to the weighing mechanism until the platform 32 is reset, and current is supplied to the solenoid 65 through the switch 86. The solenoid is energized to move the shutter 62 into the gating position to prevent any further chips being delivered into the chamber 20 and the switch 85 also supplies current to the counter to record the portion delivered. The chips discharged into the dispensing funnel may be collected in a bag or on a plate held underneath the lower end of the funnel. Upon discharge of the chips, the weighing frame is restored to its unloaded or rest position by the spring 39 in readiness for the next weighing and dispensing cycle. However, the next cycle is not commenced until the platform is reset in its horizontal position. When another portion of chips is required, it is a simple matter to swing the resetting handle through an arc of about 60° during which the lever 46 engages the lever 45 to lift and relatch the weighing platform in its horizontal position which also moves the switch 85 back to its original position. During resetting of the platform, current supply to the vibrator unit is shut-off by the disengagement of the lever 46 from the microswitch 84 as well as to the counter and solenoid 65 which moves back to its non-gating position. The lever 46 is then moved back to its original position by the spring 48, closing the microswitch 84 which switches the vibrator unit 15 on to recommence feeding chips from the tray onto the weighing platform. Since the lever 46 fixed to the handle 47 is not connected to the lever 45 with which it co-operates to raise the weighing platform, and because the handle 47 opens the switch 84 when the handle is actuated, the handle cannot be used to hold the platform in its horizontal position to increase the weight of chips dispensed beyond the preselected weight. Whilst the chips are retained in the tray for dispensing purposes, they are kept hot by the heating element 17 above the container 5. In the event of a fault or failure in the weighing mechanism, the vibrator unit can be switched-off and the device can be used as a conventional hot chip container from which the chips can be removed manually with a scoop. To facilitate removal of the chips with a scoop, the hinged cover member 58 can be lifted off the casing. In the illustrated position of the cover member the cam 61 closes the microswitch 86 which forms a switching means to allow current to energize the solenoid and thus permit operation of the shutter means. When the cover is lifted off the casing, the cam 61 disengages the microswitch 86 to stop any supply of current to the solenoid and thus prevents operation of the shutter means, i.e. gating movement of the shutter with the cover removed. The presence of the switch 86 ensures that the shutter cannot operate with the cover off, which shutter otherwise might injure an operator's fingers inadvertently placed through the open top of the dispensing chamber into the path of movement of the shutter.

Whilst a particular embodiment has been described, it will be understood that various modifications can be made without departing from the scope of the invention as defined by the appended claims. For example, the weighing platform retaining latch may be electrically or electronically operated for example, through a suitably placed load cell responsive to the preselected weight to emit a releasing signal to a latch releasing means such as a solenoid. In order further to improve accuracy, the vibrator unit circuit may also include a transducer which is sensitive to the weight of chips on the weighing platform and which is capable of emitting a signal to the vibrator unit as the weight is approaching the preselected weight to slow down the rate of vibration and thus reduce the feed of chips onto the weighing platform to a trickle feed. In this way it is possible to avoid any sudden increases in the amount of chips fed onto the weighing platform just before its release which might bring the weight of chips dispensed above the preselected weight. The levelling flaps are conveniently adjustable in height in order to control the quantity of chips being fed to the weighing platform per unit of time. When the weighing frame is made of a light material such as plastics the counterbalancing system would be omitted.

In the modification illustrated in FIGS. 8 and 9, the counterbalancing system, weighing arm 38, spring 39 and stop 40 are omitted and the weighing frame 24 is suspended by a tension spring 90 from a fixed point on the unit. An angled cam member 91 is mounted on the wall of the funnel 56 in a position such that as the weighing frame is depressed the latch member 35 engages the cam member and is disengaged from the weighing platform 32. By slidably mounting the cam member as through a vertical slot in the funnel the weight of the portion can be preselected. The cam member preferably has a pointer 92 which is movable along a graduated scale 93. The cam member 91 may alternatively be connected to an arm like the weighing arm 38 and a stop like the stop 40 may be moved vertically to adjust the weight.

In all the embodiments described the sloping bottom 6 of the chips container is made of a material which does not inhibit the feeding movement of the hot chips, the material having peaks with which the chips are in contact and hollows which allow the excess oil to drain away down the slope. A suitable material of this kind is known as a rigidized material, e.g. a metal such as stainless steel which is preferred.

By having overhead heating the operation of the vibrator unit is not affected by the heat.

It will be appreciated that the rigidized metal enables feed of the chips up the sloping feeding platform or bottom 6 of the chip container, whilst the slope allows drainage in the opposite direction away from the weighing platform. In a further modification the operating handle may be turned to a position intermediate the ends of its arcuate movement, in which the lever 46 disengages the microswitch 84 to stop the vibrator unit.

We claim:

1. A method of weighing and dispensing a portion of hot, fried, potato products of predetermined weight, comprising:
    (a) delivering a supply of potato products to a receptacle,
    (b) vibrating the receptacle and thereby feeding the potato products towards weighing means comprising a hinged weighing platform disposed adjacent one end of the receptacle and in an enclosed path for the potato products,
    (c) maintaining the supply of potato products hot in the receptacle,
    (d) draining hot, frying oil or fat from the receptacle,
    (e) continuing vibration and thereby feeding potato products into said enclosed path and onto the hinged platform,
    (f) guiding said weighing platform so that it moves vertically and linearly downwards along said enclosed path as the potato products accumulate on the platform,
    (g) detecting a predetermined weight of potato products accumulated on the platform,
    (h) and in response thereto, releasing the platform and stopping vibration, whereby to discharge the potato products accumulated on the platform from said enclosed path.

2. A unit for weighing and dispensing portions of hot, fried, potato products from a supply of such products contained in the unit, said unit comprising:
    (a) a casing,
    (b) an open-topped receptacle mounted in said casing, for receiving the supply of hot, fried, potato products,
    (c) a dispensing chamber for said potato products, in said casing,
    (d) said dispensing chamber having means defining:
        (i) a chamber inlet which opens directly into said receptacle,
        (ii) a chamber outlet below said chamber inlet, and
        (iii) an enclosed path for said potato products between said chamber inlet and outlet,
    (e) heating means for maintaining the potato products hot whilst in said receptacle and in said dispensing chamber,
    (f) said receptacle having a bottom wall which is inclined upwardly in the direction of the said chamber inlet, for allowing hot frying oil or fat to drain away from said chamber inlet,
    (g) collecting means for collecting the drained oil or fat from said receptacle bottom wall,
    (h) a weighing means including:
        (i) a weighing platform disposed inside said chamber adjacent said chamber inlet, (ii) a movable weighing platform support carrying said weighing platform and disposed in said casing and outside said chamber, (iii) hinge means connecting said weighing platform to said weighing support, and (iv) means for guiding said weighing support and thus the weighing platform for vertical, linear movement, (i) a vibrator unit disposed in said casing and coupled to said receptacle bottom wall, for causing vibration of said bottom wall and thereby feeding of said hot potato products from said receptacle, through the chamber inlet and onto said weighing platform, (j) movable levelling means for controlling the feed of chips to the weighing platform, and (k) retaining means disposed in said casing, for retaining said weighing platform in a position to receive the hot potato products and adapted to release said platform in response to the weighing means detecting a predetermined weight of the products on said platform, whereby to permit said platform to hinge downwardly and discharge the hot potato products therefrom and through the chamber outlet.

3. A unit as claimed in claim 2, including means responsive to the release of the weighing platform to interrupt the operation of the vibrator unit, and means for resetting the weighing platform to its potato product-receiving position, said resetting means including an operating member mounted externally on said casing, and means disposed inside said casing and connected to said operating member but not to said weighing platform, the raising said weighing platform to its potato product-receiving position, and said unit further including switching means cooperating with said means connected to the operating member for preventing operation of the vibrator unit during operation of said external operating member.

4. A unit as claimed in claim 3, wherein said means responsive to the release of the weighing platform comprises second switching means which is connected to the vibrator unit and which cooperates with the weighing platform whereby, when the weighing platform occupies its material-receiving and released positions, operation of the vibrator unit is initiated and stopped respectively.

5. A unit as claimed in claim 4, wherein said second switching means is connected to a counter for counting the number of portions weighed, whereby said second switching means initiates operation of said counter when said weighing platform is released.

6. A unit as claimed in claim 2, including shutter means responsive to the release of the platform to shut-off dispensing of any potato products after release of the weighing platform, said shutter means including a shutter member which is movable through a gap defined between said receptacle bottom wall and a wall of said chamber and into a position in which it projects above said weighing platform.

7. A unit as claimed in claim 6, wherein the dispensing chamber has a cover member which covers the weighing platform and which is removable to permit access thereto, and the unit includes switching means operable by the cover member to permit operation of said shutter means and when the cover is removed to prevent operation of said shutter means.

8. A unit as claimed in claim 2, wherein said bottom wall of said receptacle is made from rigidized metal sheet.

9. A unit as claimed in claim 2, wherein said heating means comprises an infra-red heating element positioned above and spaced from said vibrator unit.

10. A unit as claimed in claim 2, wherein the retaining means comprises a latch member which is carried by said weighing support, which engages the platform and which is actuated in response to the weighing means detecting the predetermined weight to be disengaged from the weighing platform to allow the latter to hinge downwardly, the weighing support comprises a vertically movable weighing frame which is guided for limited vertical movement through the intermediary of bearings on a fixed guide column and on which the weighing platform is hinged by means of a spindle of which one end projects into a guide slot at a location opposite said guide column and on which the latch member is mounted and a spring for biassing the weighing frame into an initial position for weighing, means co-operates with said latch member when the weighing frame is depressed to allow the latch member to hinge downwardly, a stop is fixed with respect to said weighing frame but is adjustable to enable preselection of the weight of the portion to be dispensed, and wherein said casing has an open top in which said receptacle is mounted and supports an electrical heating unit above the open top of the receptacle, said dispensing chamber including a dispensing funnel terminating in said chamber outlet, said receptacle having two side walls and an end wall which latter is opposite said chamber inlet across which said potato product levelling means extend to control the feed of potato products to the weighing platform, the receptacle bottom wall being separate from the side and end walls and being in the form of a tray having upwardly turned side edges which are overlapped by the receptacle side walls, and there being a gap between the receptacle rear wall and the receptacle bottom wall to permit the drainage of oil or fat from said receptacle into a drainage trough having a drainage chute leading therefrom into a drainage drawer for collecting the oil or fat and which is slidably mounted in and removable from the bottom of the casing.

* * * * *